US008605433B2

(12) United States Patent
Chiang et al.

(10) Patent No.: US 8,605,433 B2
(45) Date of Patent: Dec. 10, 2013

(54) ELECTRONIC DEVICE

(75) Inventors: Wen-Hsien Chiang, Taipei (TW); Yung-Hsiang Chen, Taipei (TW); Hsin Yeh, Taipei (TW); Wen-Yi Chiu, Taipei (TW); Ting-Wei Wu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 192 days.

(21) Appl. No.: 13/353,324

(22) Filed: Jan. 19, 2012

(65) Prior Publication Data

US 2012/0188693 A1 Jul. 26, 2012

Related U.S. Application Data

(60) Provisional application No. 61/435,790, filed on Jan. 25, 2011.

(51) Int. Cl.
*G06F 1/16* (2006.01)

(52) U.S. Cl.
USPC ............................................ 361/679.59

(58) Field of Classification Search
USPC ........................... 361/679.01, 679.59
See application file for complete search history.

(56) References Cited

U.S. PATENT DOCUMENTS

| | | | | |
|---|---|---|---|---|
| 4,259,568 A * | 3/1981 | Dynesen | ................ | 235/1 D |
| 5,128,829 A * | 7/1992 | Loew | ................ | 361/679.3 |
| 5,607,054 A * | 3/1997 | Hollingsworth | ............... | 206/320 |
| 5,682,182 A * | 10/1997 | Tsubosaka | ................ | 345/173 |
| 5,887,723 A * | 3/1999 | Myles et al. | ................ | 206/760 |
| 6,411,288 B1 * | 6/2002 | Min | ................ | 345/204 |
| 6,430,038 B1 * | 8/2002 | Helot et al. | ................ | 361/679.05 |
| 6,697,045 B2 * | 2/2004 | Min | ................ | 345/156 |
| 6,707,666 B1 * | 3/2004 | Chuang | ................ | 361/679.05 |
| 6,947,279 B2 * | 9/2005 | Cheng et al. | ................ | 361/679.06 |
| 7,318,521 B2 * | 1/2008 | Lau | ................ | 206/45.24 |
| 7,561,415 B2 * | 7/2009 | Liou et al. | ................ | 361/679.26 |
| 8,023,256 B2 * | 9/2011 | Walker et al. | ................ | 361/679.27 |
| 8,089,760 B2 * | 1/2012 | Yi-Chang | ................ | 361/679.59 |
| 8,143,982 B1 * | 3/2012 | Lauder et al. | ................ | 335/219 |
| 8,253,518 B2 * | 8/2012 | Lauder et al. | ................ | 335/219 |
| 8,264,310 B2 * | 9/2012 | Lauder et al. | ................ | 335/219 |
| D677,264 S * | 3/2013 | Lu et al. | ................ | D14/451 |
| D677,265 S * | 3/2013 | Lu et al. | ................ | D14/451 |
| 2004/0114315 A1* | 6/2004 | Anlauff | ................ | 361/681 |
| 2011/0134588 A1* | 6/2011 | Barnett | ................ | 361/679.01 |
| 2011/0286171 A1* | 11/2011 | Franz et al. | ................ | 361/679.21 |
| 2012/0106054 A1* | 5/2012 | Royz et al. | ................ | 361/679.3 |

* cited by examiner

*Primary Examiner* — Lisa Lea Edmonds
(74) *Attorney, Agent, or Firm* — Jianq Chyun IP Office (57) ABSTRACT

An electronic device is provided, which includes a display, a housing and a supporting structure. The display is disposed in the housing and a side of the housing opposite to the display has a storeroom. The supporting structure is disposed at the storeroom and has a flexible sheet, a first supporting-part and a second supporting-part. One end of the flexible sheet is fixed to the storeroom, the first supporting-part and the second supporting-part are respectively disposed at the flexible sheet, and the second supporting-part is bent relatively to the first supporting-part through the flexible sheet so as to provide the housing with a supporting force.

11 Claims, 9 Drawing Sheets

ELECTRONIC DEVICE

CROSS-REFERENCE TO RELATED APPLICATION

This application claims the priority benefits of U.S. provisional application Ser. No. 61/435,790, filed on Jan. 25, 2011. The entirety of the above-mentioned patent applications is hereby incorporated by reference herein and made a part of this specification.

BACKGROUND OF THE INVENTION

1. Field of the Invention

The invention generally relates to an electronic device, and more particularly, to an electronic device with a supporting structure.

2. Description of Related Art

Currently, in the era of information explosion, electronic products have become indispensable in daily life. As the continuous progress of the electronic technology, electronic products with humanization designs and preferred functions are bringing out the new products all the time. As for the development and application of personal computers, desktop personal computers (desktop PCs) are firstly developed, but the desktop PCs have the defects of being heavy and inconvenient for being taken along. Thus, notebook PCs and tablet PCs convenient to be taken are developed.

Generally, since a tablet PC itself is unable to be erected on a table, the user during manipulating or viewing the tablet PC must use a supporting frame to make the tablet PC upwards tilt. If no supporting frame is available, the user usually holds the tablet PC by hand to make the tablet PC upwards tilt, which is very inconvenient in use indeed.

SUMMARY OF THE INVENTION

Accordingly, the invention is directed to an electronic device suitable to be erect on a plane in upwards tilting way.

The invention provides an electronic device, which includes a display, a housing and a supporting structure. The display is disposed in the housing and a side of the housing opposite to the display has a storeroom. The supporting structure is disposed at the storeroom and has a flexible sheet, a first supporting-part and a second supporting-part. One end of the flexible sheet is fixed to the storeroom, the first supporting-part and the second supporting-part are respectively disposed at the flexible sheet, and the second supporting-part is bent relatively to the first supporting-part through the flexible sheet so as to provide the housing with a supporting force.

In an embodiment of the present invention, the above-mentioned housing has a first side and a second side opposite to the first side; a first included angle is formed between the housing and a plane when the first side and the supporting structure together support the housing on the plane, and a second included angle is formed between the housing and the plane when the second side and the supporting structure together support the housing on the plane.

In an embodiment of the present invention, the above-mentioned flexible sheet has a first end and a second end, the first end is connected to the storeroom and the second end is movable disposed at the storeroom.

In an embodiment of the present invention, the above-mentioned housing has a fixing-portion, and the second end is fixed at the fixing-portion when the second end is bent toward the first end.

In an embodiment of the present invention, the above-mentioned storeroom has a first magnetic block, the second end of the flexible sheet has a second magnetic block, and the magnetic forces of the first magnetic block and the second magnetic block are attracted by each other.

In an embodiment of the present invention, the above-mentioned first supporting-part and the second supporting-part are disposed at a same surface of the flexible sheet.

In an embodiment of the present invention, the above-mentioned first supporting-part and the second supporting-part are disposed at different surfaces of the flexible sheet.

In an embodiment of the present invention, the above-mentioned first supporting-part and the second supporting-part are integrated formed with the flexible sheet.

In an embodiment of the present invention, the above-mentioned first supporting-part and the second supporting-part lean against each other to provide the housing with the supporting force.

In an embodiment of the present invention, an included angle is formed between the above-mentioned first supporting-part and the second supporting-part and the included angle is an acute angle.

In an embodiment of the present invention, an included angle is formed between the above-mentioned first supporting-part and the second supporting-part and the included angle is an obtuse angle.

Based on the description above, the housing of the electronic device of the invention employs a supporting structure, and the supporting structure is formed by a flexible sheet and a first supporting-part and a second supporting-part both disposed at the flexible sheet. By means of deflection of the flexible sheet, the second supporting-part is bent relatively to the first supporting-part so as to make the supporting structure form a specific shape. In this way, the housing of the electronic device can be supported on the plane through the supporting structure with specific shapes so as to advance the convenience of manipulating and viewing.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

Figure 1:
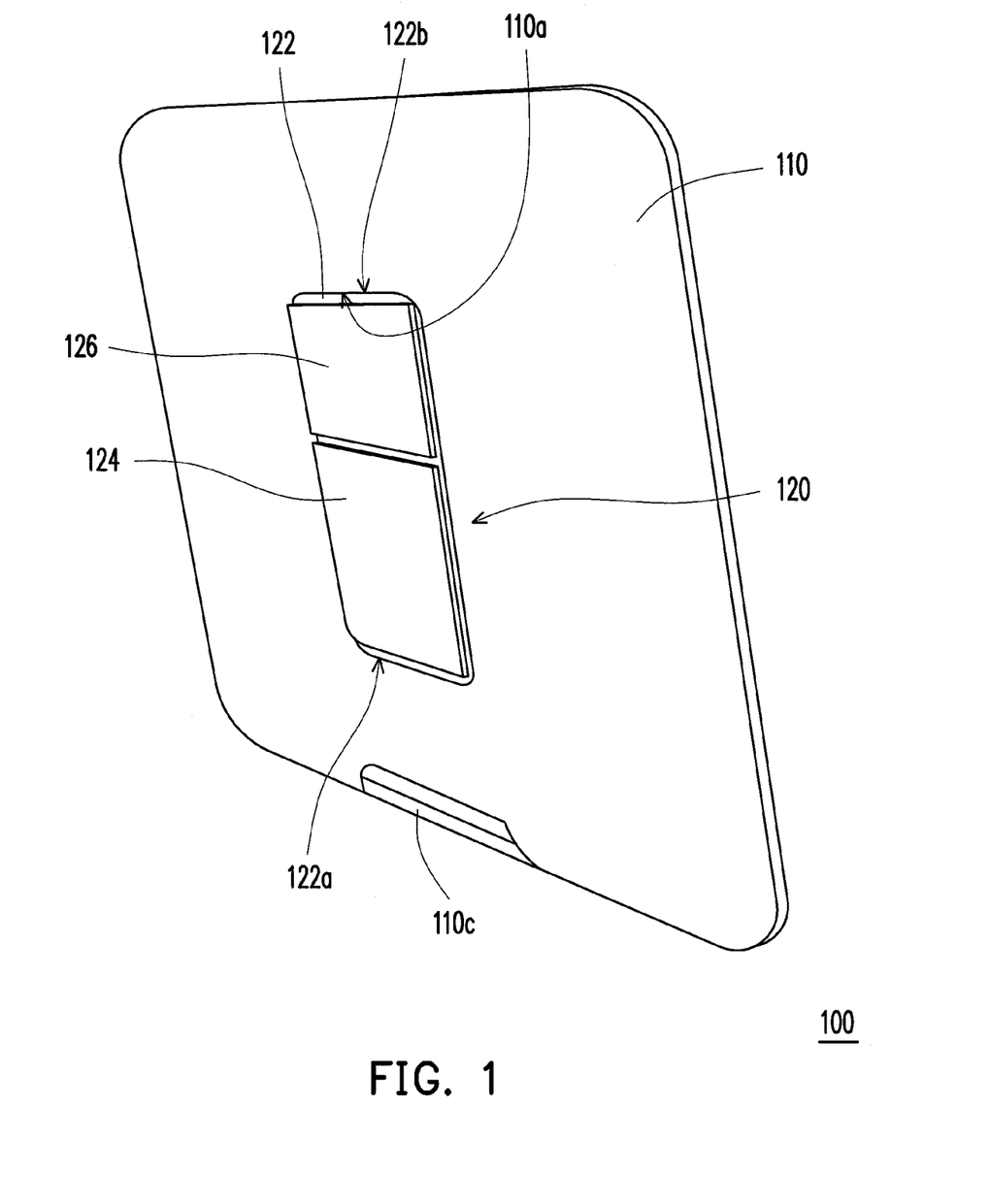
FIG. 1 is a schematic three-dimensional diagram of an electronic device according to an embodiment of the invention.
Figure 2:
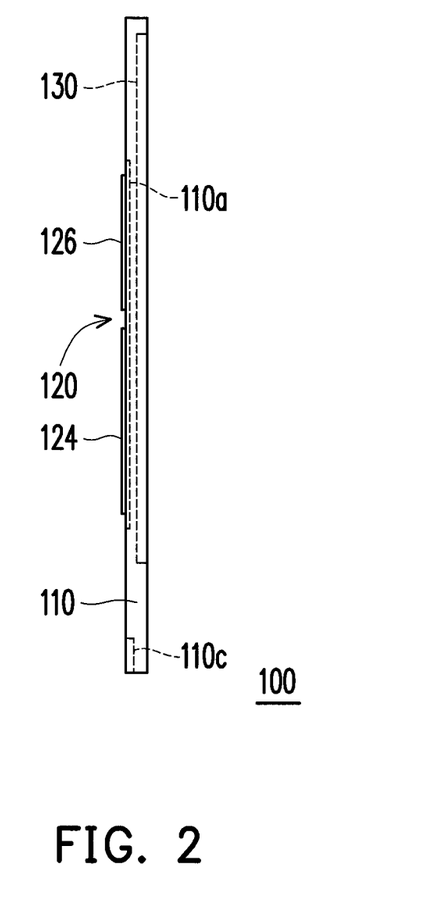
FIG. 2 is a side view of the electronic device of FIG. 1.

FIG. 1 is a schematic three-dimensional diagram of an electronic device according to an embodiment of the invention and FIG. 2 is a side view of the electronic device of FIG.

1. Referring to FIGS. 1 and 2, an electronic device 100 of the embodiment includes a housing 110, a supporting structure 120 and a display 130. The display 130 is disposed in the housing 110 and a storeroom 110a is disposed at a side of the display 130. The supporting structure 120 is disposed at the storeroom 110a and has a flexible sheet 122, a first supporting-part 124 and a second supporting-part 126. The flexible sheet 122 has a first end 122a and a second end 122b, the first end 122a is connected to the storeroom 110a, and the second end 122b is movably disposed at the storeroom 110a. The first supporting-part 124 and the second supporting-part 126 are respectively disposed at the flexible sheet 122. The second supporting-part 126 can be bent relatively to the first supporting-part 124 through the flexible sheet 122 so as to provide the housing 110 with a supporting force. The way for the supporting structure 120 to support the housing 110 is described in following in association with the figures.

Figure 3A:
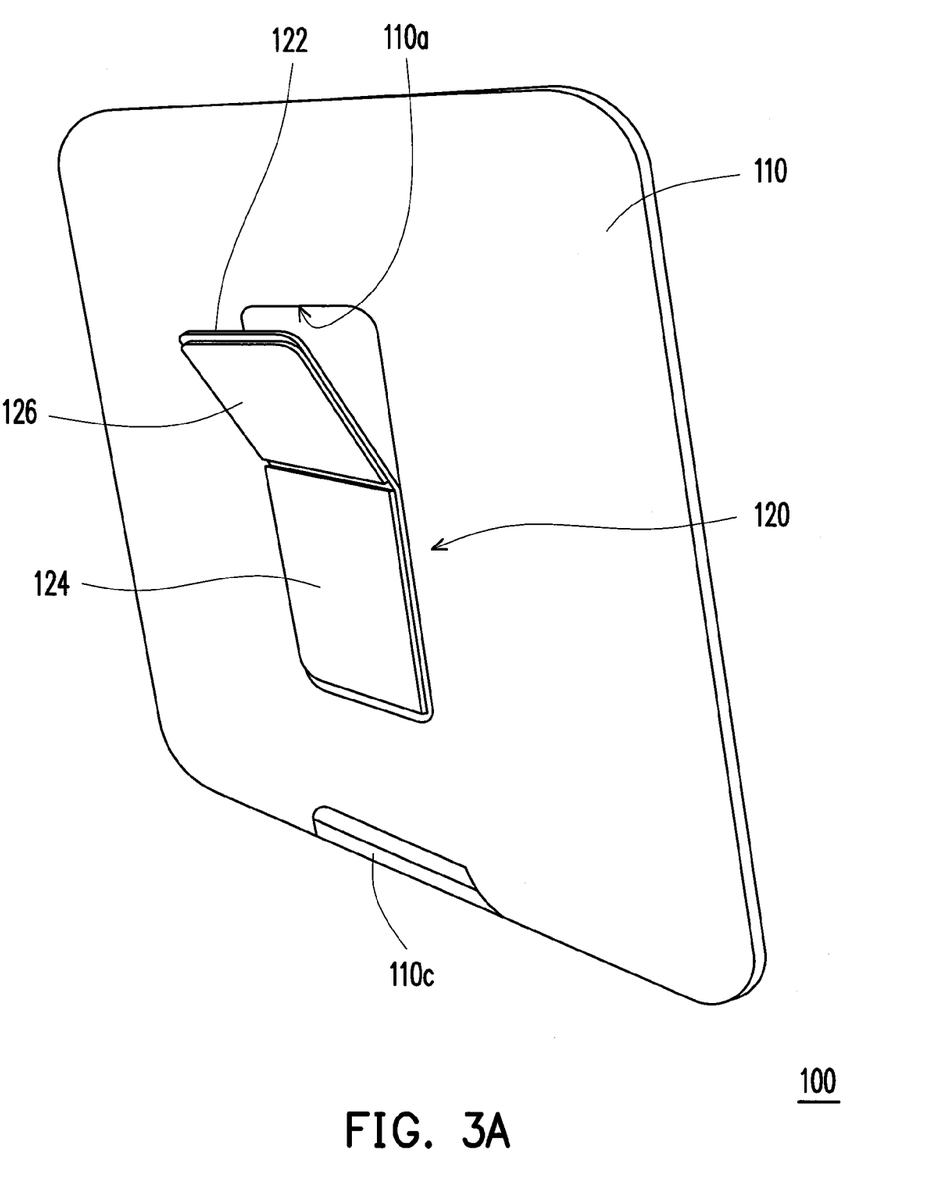
FIGS. 3A-3D are action flowcharts of the supporting structure of FIG. 1.
Figure 3B:
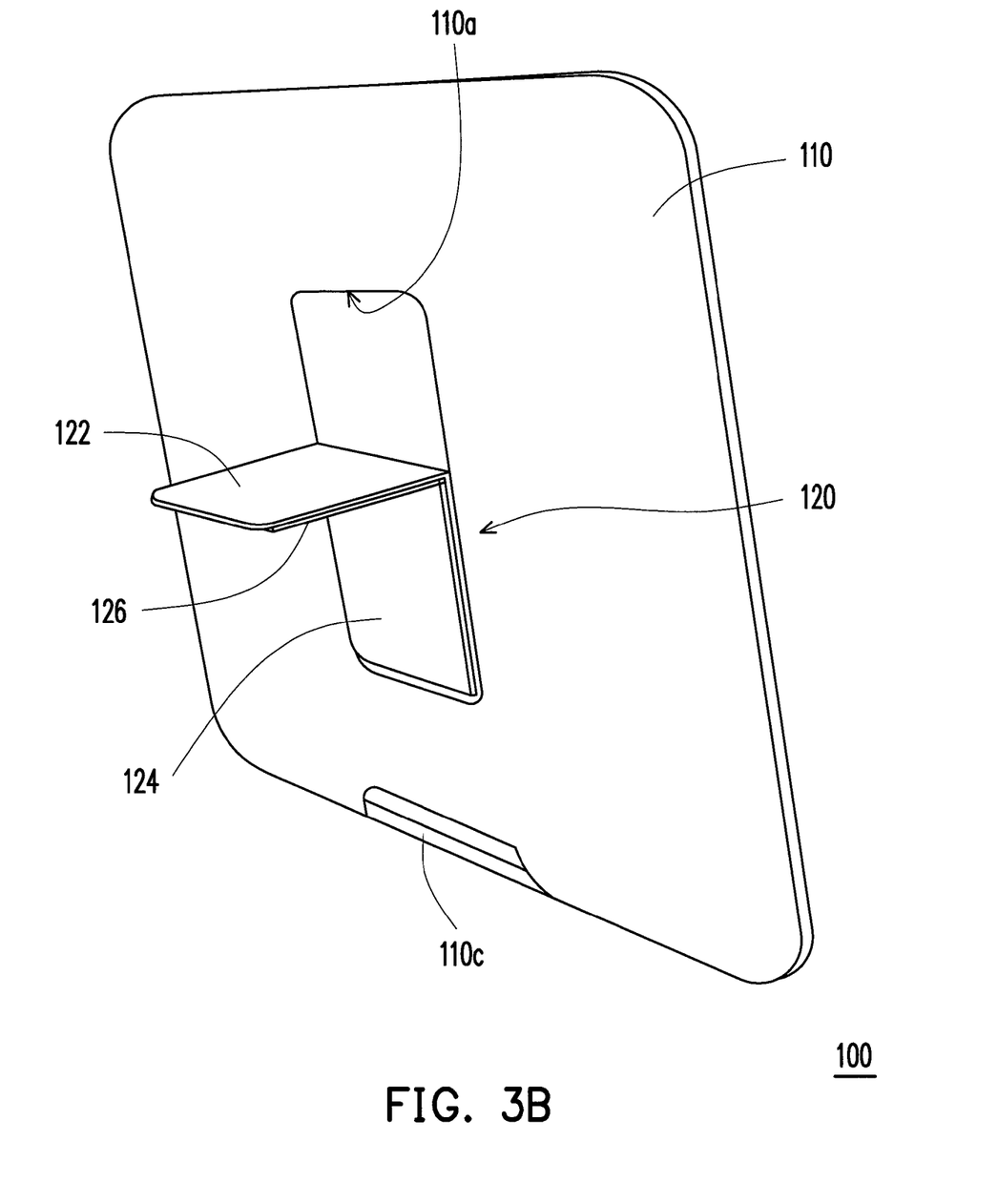
Figure 3C:
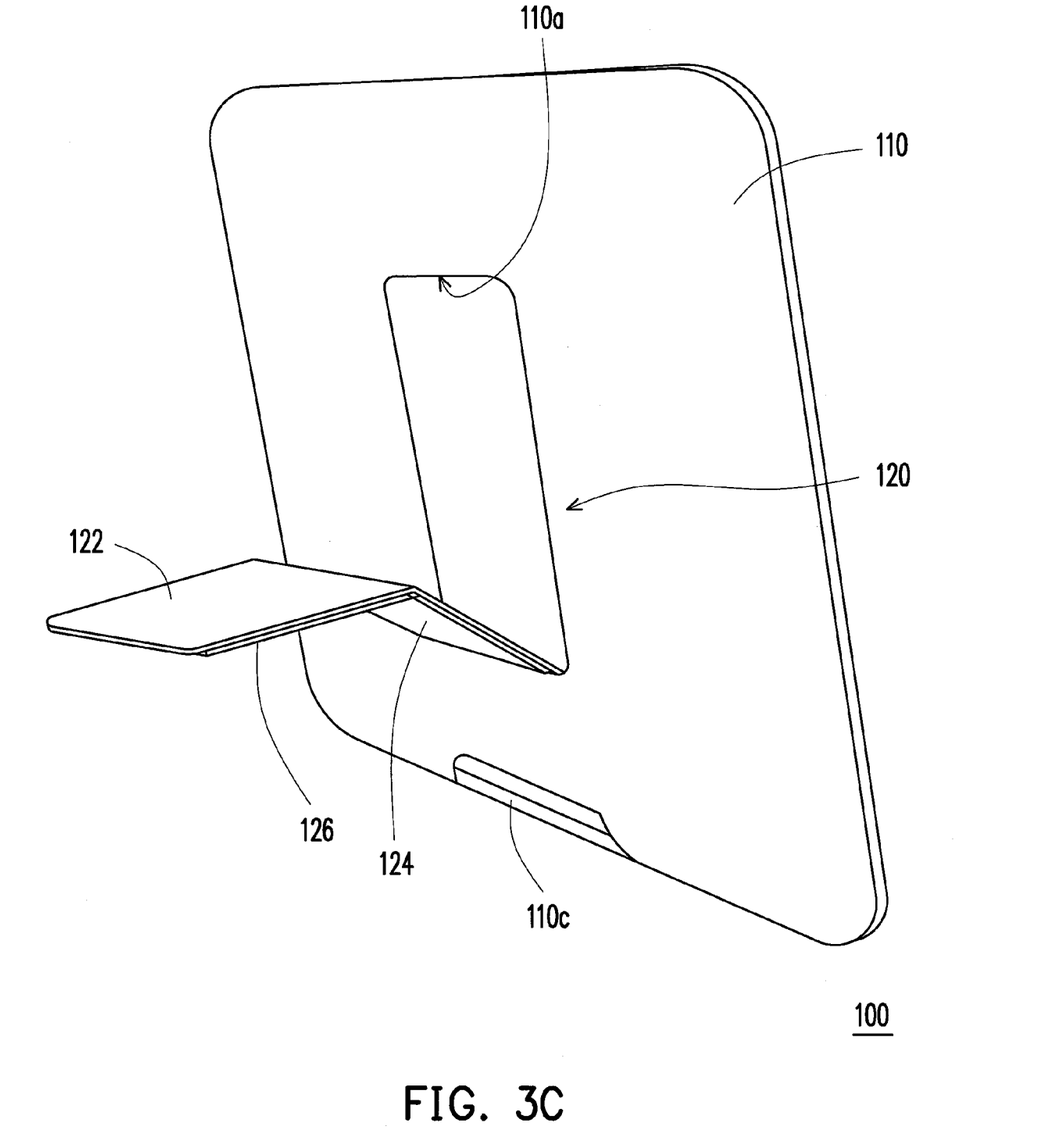
Figure 3D:
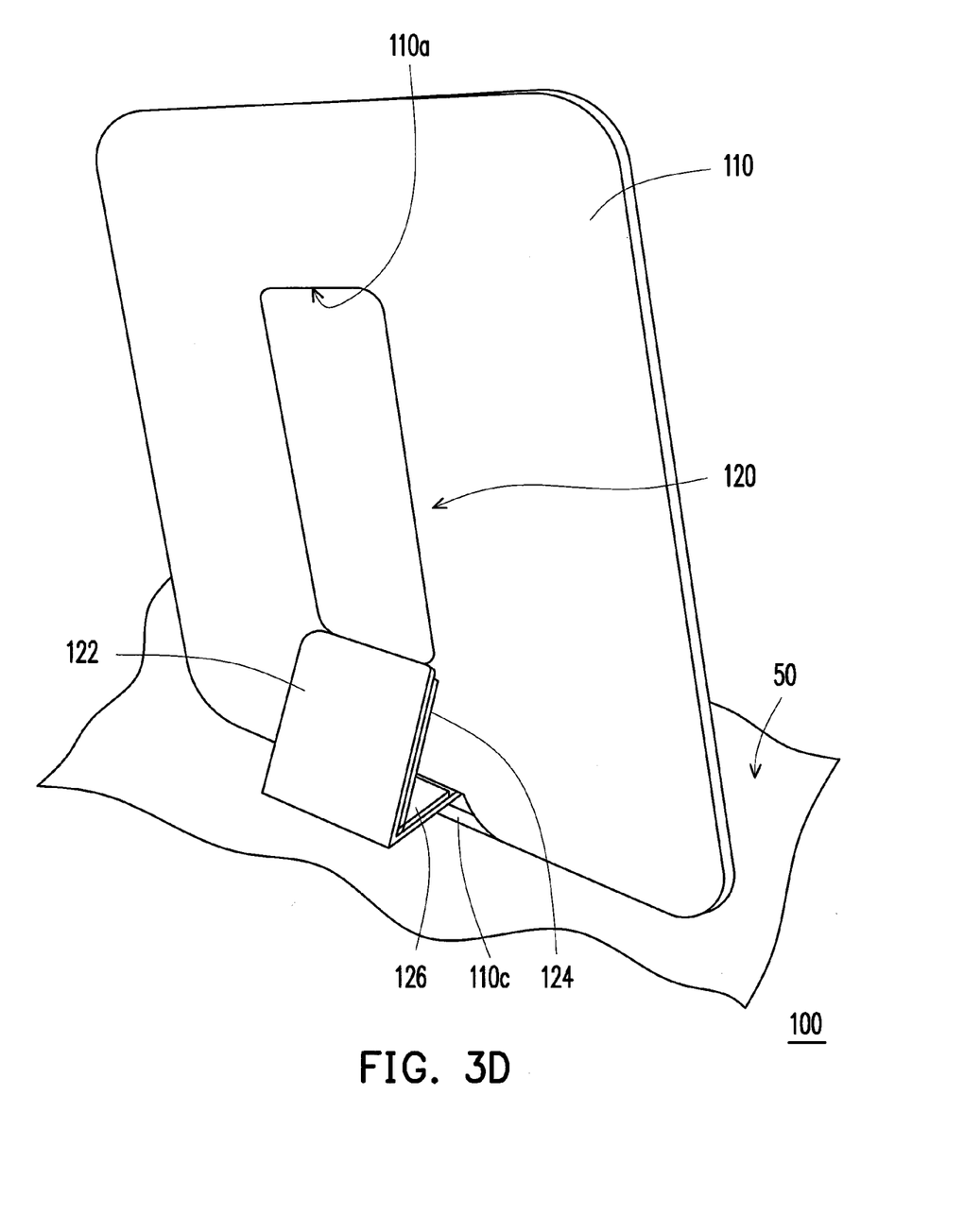

FIGS. 3A-3D are action flowcharts of the supporting structure of FIG. 1. When a user does not use the supporting structure 120, the flexible sheet 122 is flat placed in the storeroom 110a as shown by FIG. 1. When the user wants to use the supporting structure 120 to support the housing 110 of the electronic device 100, the user can apply a force to the supporting structure 120 to make the second supporting-part 126 sequentially bent as shown by FIGS. 3A and 3B relatively to the first supporting-part 124 through deflecting of the flexible sheet 122. Then, the user keeps applying the force to the supporting structure 120 to make the first supporting-part 124 sequentially bent as shown by FIGS. 3C and 3D through deflecting of the flexible sheet 122, which enables the supporting structure 120 providing the housing 110 with a supporting force to make the housing 110 supported on a plane 50, as shown by FIG. 3D.

With the above-mentioned layout, the supporting structure 120 has an orientation as shown by FIG. 3D through deflecting of the flexible sheet 122, where the first supporting-part 124 and the second supporting-part 126 have an acute angle therebetween to form a specific shape. In this way, the housing 110 of the electronic device 100 is supported on the plane 50 through the supporting structure 120 with a specific shape, which advances the convenience of manipulating and viewing.

In the embodiment, the second end 122b of the flexible sheet 122 is suitable to lean against the housing 110 as shown by FIG. 3D through deflecting of the flexible sheet 122, so that the supporting structure 120 can firmly support the housing 110. In more details, the housing 110 of the embodiment has a fixing-portion 110c. When the second end 122b of the flexible sheet 122 leans against the housing 110 through deflecting of the flexible sheet 122, the second end 122b is fixed at the fixing-portion 110c to make the whole structure more firm.

In the embodiment, the first supporting-part 124, the second supporting-part 126 and the flexible sheet 122 are, for example, together integrated formed by a plastic double-injection process, which the invention is not limited to. In other embodiments, the first supporting-part 124, the second supporting-part 126 and the flexible sheet 122 can be non-integrated formed.

As shown by FIG. 2, in the embodiment, the length of the first supporting-part 124 is greater than the length of the second supporting-part 126 to keep the housing 110 at an orientation for the user to conveniently manipulate and view by the supporting structure 120 as shown in FIG. 3D. In other embodiments, the length of the first supporting-part has different ratios over the length of the second supporting-part by design according to the demand, which the invention is not limited to.

Figure 4A:
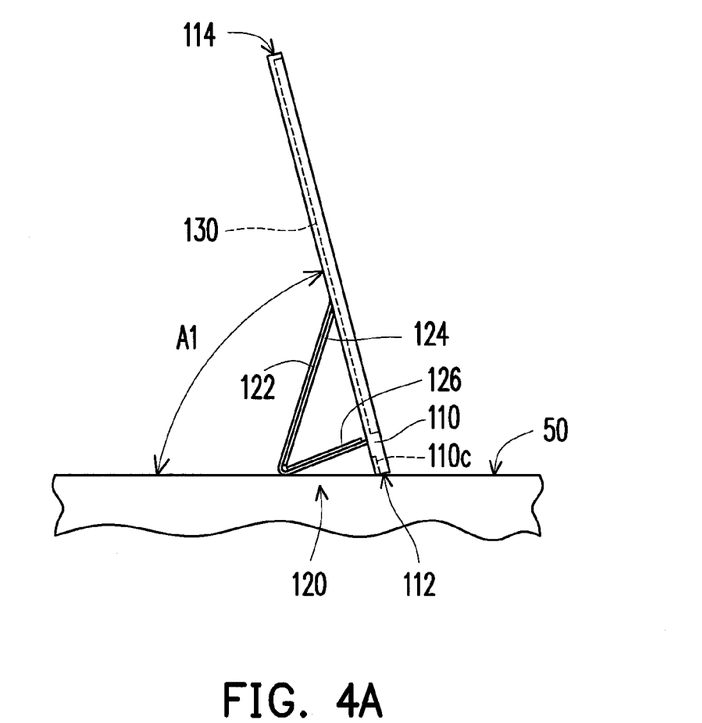
FIGS. 4A and 4B are diagrams showing different orientations to support the electronic device on a plane by using the supporting structure of FIG. 1.
Figure 4B:
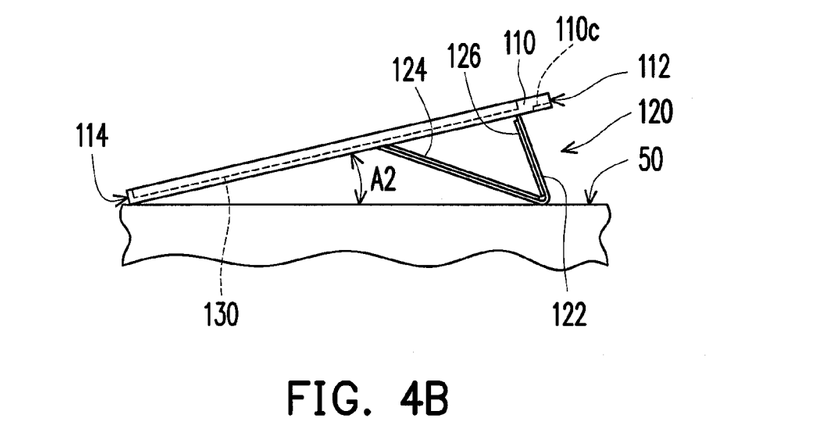

FIGS. 4A and 4B are diagrams showing different orientations to support the electronic device on a plane by using the supporting structure of FIG. 1. Referring to FIGS. 4A and 4B, the housing 110 has a first side 112 and a second side 114 opposite to the first side 112. The user can use the first side 112 and the supporting structure 120 together to make the housing 110 supported at the plane 50 as shown by FIG. 4A (the same supporting way as FIG. 3D), so that a first included angle A1 is formed between the housing 110 and the plane 50. The user can also use the second side 114 and the supporting structure 120 together making the housing 110 supported at the plane 50 as shown by FIG. 5B, so that a second included angle A2 less than the first included angle A1 is formed between the housing 110 and the plane 50. The placing ways in FIGS. 5A and 5B are different, which enables the electronic device 100 having different tilting angles. In this way, the user can view the frame on the display 130 when the included angle between the housing 110 and the plane 50 is the first included angle A1, while the user can conduct touch operations on the display 130 when the included angle between the housing 110 and the plane 50 is the second included angle A2.

Figure 5:
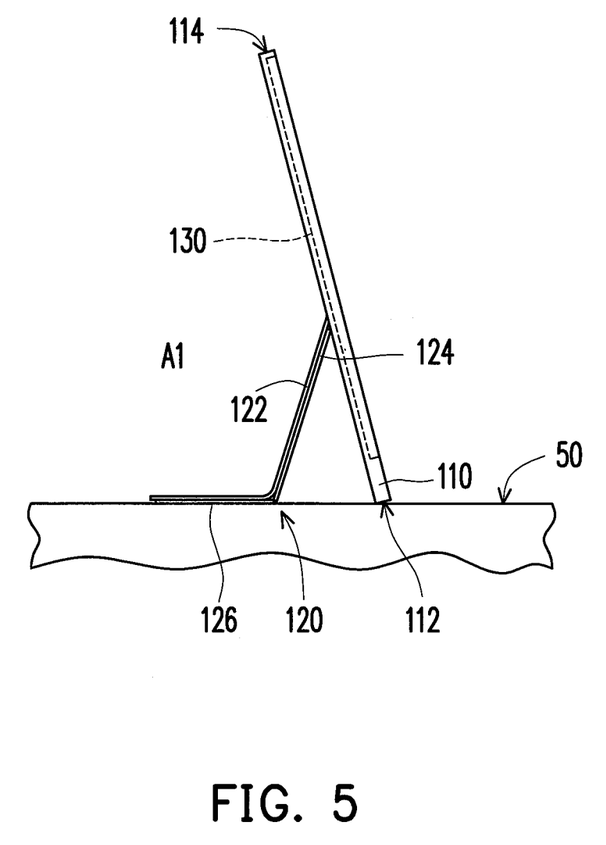
FIG. 5 is a schematic diagram of an electronic device according to another embodiment of the invention.

FIG. 5 is a schematic diagram of an electronic device according to another embodiment of the invention. In FIG. 5, the bending direction of the second supporting-part 126 relatively to the first supporting-part 124 is opposite to the bending direction of the second supporting-part 126 relatively to the first supporting-part 124 of the previous embodiment (as shown by FIG. 4). In the embodiment, the first supporting-part 124 and the second supporting-part 126 lean against each other to provide the housing 110 with the supporting force, which has the same function to make the housing 110 supported on the plane 50, wherein an obtuse angle is formed between the first supporting-part 124 and the second supporting-part 126. When the supporting structure 120 supports the housing 110 in the way shown by FIG. 5, the flexible sheet 122 is not required to be fixed at the fixing-portion 110c. In other words, the fixing-portion 110c can be employed or omitted depending on the action way of the supporting structure 120, which the invention is not limited to.

Figure 6:
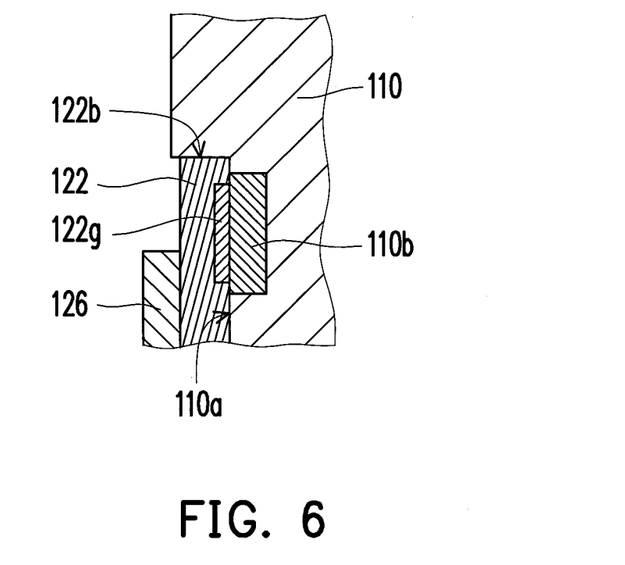
FIG. 6 is a partial cross-sectional diagram of an electronic device according to yet another embodiment of the invention.

FIG. 6 is a partial cross-sectional diagram of an electronic device according to yet another embodiment of the invention. Referring to FIG. 6, in the embodiment, the storeroom 110a of the housing 110 has a first magnetic block 110b, the second end 122b of the flexible sheet 122 has a second magnetic block 122g, and the first magnetic block 110b and the second magnetic block 122g are attracted by each other through the magnetic forces thereof to fix the flexible sheet 122 at the storeroom 110a.

Figure 7:
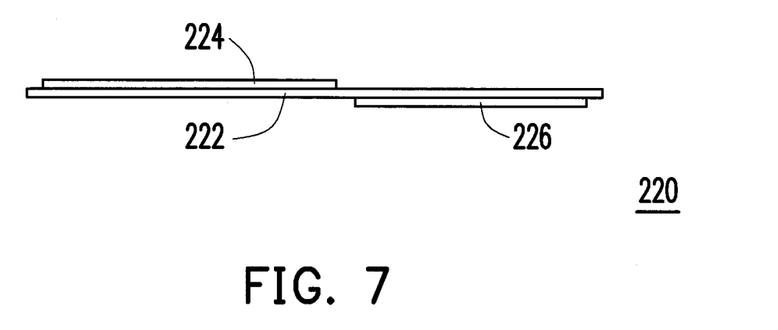
FIG. 7 is a schematic diagram of a supporting structure according to yet another embodiment of the invention.

In the embodiment, the first supporting-part 124 and the second supporting-part 126 are disposed at a same surface of the flexible sheet 122, which the invention is not limited to. FIG. 7 is a schematic diagram of a supporting structure according to yet another embodiment of the invention. In the supporting structure 220 of FIG. 7, the first supporting-part 224 and the second supporting-part 226 are disposed at different surfaces of the flexible sheet 222.

In summary, the housing of the electronic device of the invention employs a supporting structure, and the supporting structure is formed by a flexible sheet and a first supporting-part and a second supporting-part both disposed at the flexible sheet. By means of deflection of the flexible sheet, the second supporting-part is bent relatively to the first supporting-part so as to make the supporting structure form a specific shape.

In this way, the housing of the electronic device can be supported on the plane through the supporting structure with specific shapes so as to advance the convenience of manipulating and viewing.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An electronic device, comprising:
    a display;
    a housing, wherein the display is disposed in the housing and a side of the housing opposite to the display has a storeroom; and
    a supporting structure, disposed at the storeroom and having a flexible sheet, a first supporting-part and a second supporting-part, wherein one end of the flexible sheet is fixed to the storeroom, the first supporting-part and the second supporting-part are respectively disposed at the flexible sheet, and the second supporting-part is bent relatively to the first supporting-part through the flexible sheet so as to provide the housing with a supporting force.

2. The electronic device as claimed in claim 1, wherein the housing has a first side and a second side opposite to the first side, a first included angle is formed between the housing and a plane when the first side and the supporting structure together support the housing on the plane, and a second included angle is formed between the housing and the plane when the second side and the supporting structure together support the housing on the plane.

3. The electronic device as claimed in claim 1, wherein the flexible sheet has a first end and a second end, the first end is connected to the storeroom and the second end is movable disposed at the storeroom.

4. The electronic device as claimed in claim 3, wherein the housing has a fixing-portion, and the second end is fixed at the fixing-portion when the second end is bent toward the first end.

5. The electronic device as claimed in claim 3, wherein the storeroom has a first magnetic block, the second end of the flexible sheet has a second magnetic block, and the magnetic forces of the first magnetic block and the second magnetic block are attracted by each other.

6. The electronic device as claimed in claim 1, wherein the first supporting-part and the second supporting-part are disposed at a same surface of the flexible sheet.

7. The electronic device as claimed in claim 1, wherein the first supporting-part and the second supporting-part are disposed at different surfaces of the flexible sheet.

8. The electronic device as claimed in claim 1, wherein the first supporting-part and the second supporting-part are integrated formed with the flexible sheet.

9. The electronic device as claimed in claim 1, wherein the first supporting-part and the second supporting-part lean against each other to provide the housing with the supporting force.

10. The electronic device as claimed in claim 1, wherein an included angle is formed between the first supporting-part and the second supporting-part and the included angle is an acute angle.

11. The electronic device as claimed in claim 1, wherein an included angle is formed between the first supporting-part and the second supporting-part and the included angle is an obtuse angle.

* * * * *